United States Patent [19]

Dion

[11] Patent Number: 4,581,531
[45] Date of Patent: Apr. 8, 1986

[54] METHOD FOR IDENTIFYING HYDROTHERMAL ALTERATION AREAS OF THE EARTH

[75] Inventor: Eric P. Dion, Dallas, Tex.

[73] Assignee: Mobil Oil Corporation, New York, N.Y.

[21] Appl. No.: 552,522

[22] Filed: Nov. 16, 1983

[51] Int. Cl.⁴ .............................................. G01T 1/20
[52] U.S. Cl. ..................................................... 250/253
[58] Field of Search ........................................ 250/253

[56] References Cited

U.S. PATENT DOCUMENTS 3,919,547 11/1975 Foote ................................. 250/253

Primary Examiner—Alfred E. Smith
Assistant Examiner—Richard Hanig
Attorney, Agent, or Firm—A. J. McKillop; Michael G. Gilman; George W. Hager, Jr.

[57] ABSTRACT

An aerial natural gamma radiation survey is conducted over an exploration region. A change in the measured T1-208/K-40 ratio in the exploration region in contrast to a region known not to be hydrothermally altered identifies the exploration region as a hydrothermal alteration. A surface natural gamma radiation survey is conducted over the hydrothermally altered exploration region. A change in the T1-208/K-40 ratio at specific sites within the exploration region indicates the location of alteration products.

2 Claims, 2 Drawing Figures

METHOD FOR IDENTIFYING HYDROTHERMAL ALTERATION AREAS OF THE EARTH

BACKGROUND OF THE INVENTION

Natural gamma-ray spectral measurements have been found to be useful indicators of hydrothermal alteration. As disclosed in "Exploration for Hydrothermal Mineralization With Airborne Gamma-Ray Spectrometry" by R. Bennett in Geochemical Exploration, CIM Special Volume No. 11, pgs. 475–478, 1974, variations in the concentrations of potassium, uranium and thorium along areial flight lines can be determined by measuring gamma radiation with a high sensitivity airborne gamma-ray spectrometer with large volume sodium iodide crystal detectors. Hydrothermal alteration patterns have been indicated by anomalous measured values of such concentrations of potassium, uranium and thorium.

SUMMARY OF THE INVENTION

In accordance with the present invention, hydrothermal alteration regions of the earth are identified through natural gamma radiation surveys. An aerial natural gamma radiation reconnaissance survey is conducted over an exploration area. The thallium-208(Tl-208) and potassium-40(K-40) ratio over the exploration area is identified from the measured natural gamma radiation of the aerial survey. This Tl-208/K-40 ratio is compared to that from an area known to be a non-hydrothermal alteration area. a hydrothermal alteration region is identified within the exploration area wherever the Tl-208/K-40 ratio for the exploration area is changed from that of the non-hydrothermal alteration area.

In a further aspect of the invention, a surface natural gamma radiation survey is conducted over the identified hydrothermal alteration region. The Tl-208/K-40 ratio over the region is identified from the measured natural gamma radiation of the surface survey. Specific alteration product sites are identified within the hydrothermal alteration region wherever the Tl-208/K-40 ratio for the sites is changed from that of the hydrothermal alteration region.

In a still further aspect the alteration product site is identified as the site of ore deposition wherever the Tl-208/K-40 ratio of the site is changed from that of the hydrothermal alteration region is a first direction and is identified as a site of ore leaching wherever the Tl-208/K-40 ratio of the site is changed from that of the hydrothermal alteration region in a second direction.

DESCRIPTION OF THE PREFERRED EMBODIMENT

The present invention is directed to the identification of hydrothermally altered earth areas that identify potential ore mineral exploration targets. Over geological time formation rock-water interactions can hydrothermally alter the composition of the rock through either a leaching process or a depositional process, thereby creating ore deposits. From such an alteration, the geologist attempts to determine the rock's potential ore bearing capability.

Figure 1:
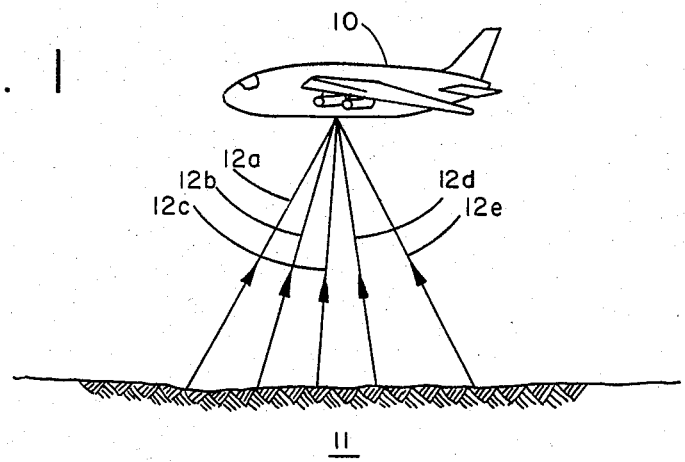
FIG. 1 illustrates an airborne natural gamma radiation regional survey.

It is a specific aspect of the present invention to identify a hydrothermally altered region by detecting a change in the thallium-208(Tl-208) and potassium-40 (K-40) ratio of such region over that of a region known to not be hydrothermally altered. These ratios are interpreted by a geologist in terms of the specific geologic setting of a region since the exact ratios may vary with different alteration patterns and geologic setting. Initially the area to be identified as to its exploration potential through hydrothermal alteration is mapped from an aerial natural gamma radiation reconnaissance survey as shown in FIG. 1. The aircraft 10 traverses the earth formation 11 with a gamma ray detector for measuring the natural gamma radiation emmitting from a given segment of the earth as indicated by ray paths 12a–12e. A large volume sodium iodide crystal detector, such as model 11.544/(7)3 supplied by Bicron Corp. of 11.5 inches diameter×4 inches thick NaI(Tl), for example, may be employed. The concentrations of Tl-208 and K-40 contained in such natural gamma radiation meaasurements are identified and their ratio determined.

Secondly the Tl-208/K-40 ratio is identified for a nearby area that is known not to have been hydrothermally altered. If such a ratio is not readily available, an aerial survey can be made over the non-hydrothermal alteration area. Any change between the measured gamma radiation ratios Tl-208/K-40 is a positive indication that the area to be identified for exploration potential has been hydrothermally altered. The Tl-208/K-40 ratio in the hydrothermally altered area could be higher or lower than that of the non-hydrothermally altered area depending on the type of hydrothermal dispersion that has taken place, that is, leaching or deposition. The aerial survey integrates the gamma-ray signals from broad areas the width of which depends upon the height at which the survey is made. The aerial survey is therefore utilized to delineate altered regions rather than for identifying smaller scale alteration products which are specifically associated with ore mineralization.

Having idenfified a regional area that has been hydrothermally altered, it is a further aspect of the invention to carry out a surface natural gamma radiation survey over the identified regional area to identify those specific areas within the hydrothermally altered region where the alteration products of leaching or dispersion can be found. Such a surface survey can be carried out by use of a small volume sodium iodide crystal such as, for example, model 3MT3/3 supplied by Bicron Corp. with crystal dimensions of 3 inches diameter by 3 inches length.

In similar manner to the identification of a hydrothermally altered region from a non-hydrothermally altered region, a specific site within the hydrothermally altered region containing the alteration products can be identified by comparing the Tl-208/K-40 ratios at such specific sites as measured by the surface survey with the ratio determined for the entire region as measured by the airborne survey. Again the surface measured Tl-208/K-40 ratio for a specific site containing an alteration product can be higher or lower than the airborne measured Tl-208/K-40 ratio for the overall alteration region depending upon whether the alteration at ths specific site is due to leaching or deposition.

Figure 2:
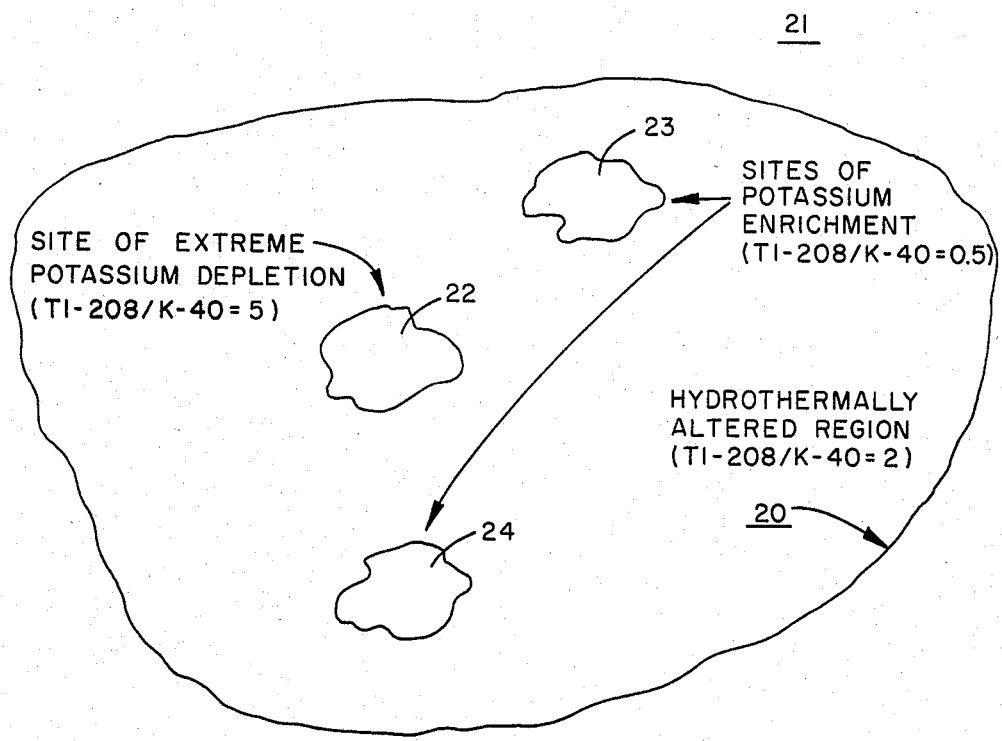
FIG. 2 illustrates the use of the airborne natural gamma radiation survey of FIG. 1 in identifying hydrothermal alteration regions in accordance with the present invention.

An example of the foregoing described invention is illustrated in FIG. 2. It is assumed for purposes of example in FIG. 2 that the T1-208/K-40 ratio measured by an airborne survey within the region 20 to be explored is 2. An adjacent region 21 known to be non-hydrothermally altered is found to have a T1-208/K-40 ratio of 1. In this example the increase in T1-208K-40 ratio from the region 21 to the region 20 indicates that region 20 has been hydrothermally altered by way of regional potassium leaching. A lower ratio in region 20 over region 21 would have indicated hydrothermal alteration by way of regional potassium enrichment.

In the example of FIG. 2, the surface survey indicates site 22 for which the T1-208/K-40 ratio is greater than that of the entire region 20 and sites 23 and 24 for which the T1-208/K-40 ratio is less than that of the entire region 20. Sites 22–$\geq$ therefore identify the specific points within region 20 wherein the alteration products are located due to potassium deposition or leaching associated with the mineralization process. The magnitude and direction of change in T1-208/K-40 ratios is dependent upon the geologic circumstances of the alteration process. The significance of these ratios to sites of ore mineralization must be interpreted by the geologist in terms of both the geologic setting and whether the target mineral will follow the path of T1-208 (Th) or potassium.

I claim:

1. A method for identifying hydrothermal alteration areas of the earth comprising the steps of:
   (a) conducting a first aerial natural gamma radiation survey over a known non-hydrothermal alteration area,
   (b) identifying a first T1-208/K-40 ratio of said known non-hydrothermal alteration area from the measured natural gamma radiation of said first aerial survey,
   (c) conducting a second aerial natural gamma radiation survey over an exploration area,
   (d) identifying a second T1-208/K-40 ratio over said exploration area from the measured natural gamma radiation of said second aerial survey,
   (e) comparing said second T1-208/K-40 ratio from the second survey over said exploration area with said first T1-208/K-40 ratio from the first survey over said known non-hydrothermal alteration area,
   (f) identifying said exploration area as a hydrothermal alteration region wherever said second T1-208/K-40 ratio for said exploration area is changed from said first T1-208/K-40 ratio for said known non-hydrothermal alteration area,
   (g) conducting a third surface natural gamma radiation survey over said exploration area,
   (h) identifying a third T1208/K-40 ratio over said exploration area from the measured natural gamma radiation of said third surface survey,
   (i) comparing said third T1-208/K-40 ratio from the third surface survey over said exploration area with said second T1-208/K-40 ratio from the second survey over said exploration area,
   (j) identifying an ore deposition site within said exploration area wherever said third T1-208/K-40 ratio for said site is changed in a first direction from said second T1-208/K-40 ratio from the second survey for said exploration area, and
   (k) identifying an ore leaching site within said exploration area whenever said third T1208/K-40 ratio for said site is changed in a second direction from said second T1-208/K-40 ratio from the second survey for said exploration area.

2. The method of claim 1 wherein said alteration product site is identified as a site of ore deposition wherever the T1208/K-40 ratio for said site is higher than that of said hydrothermal alteration region and is identified as a site of ore leaching whenever the T1208/K-40 ratio for said site is lower than that of said hydrothermal alteration region.

* * * * *